United States Patent [19]

Friedrich

[11] Patent Number: 4,519,067

[45] Date of Patent: May 21, 1985

[54] COMMUNICATION SYSTEM PROVIDING AMPLIFIER GAIN BY HALF-CYCLE CARRIER SIGNAL CONTROL

[75] Inventor: Douglas S. Friedrich, Benfleet, England

[73] Assignee: Marconi Avionics Limited, Rochester, England

[21] Appl. No.: 487,027

[22] Filed: Apr. 21, 1983

[30] Foreign Application Priority Data

Apr. 22, 1982 [GB] United Kingdom ............... 8211655

[51] Int. Cl.³ .......................... H04J 7/02; H04J 3/02
[52] U.S. Cl. .......................................... 370/78; 455/68
[58] Field of Search .................... 370/78; 455/68, 103, 455/104

[56] References Cited

U.S. PATENT DOCUMENTS

| Re. 25,699 | 12/1964 | Kidd | 179/15 |
|---|---|---|---|
| 2,907,830 | 10/1959 | Boutry et al. | 370/78 |
| 2,921,981 | 1/1960 | Kidd | 370/78 |
| 3,013,147 | 12/1961 | Gverth | 370/78 |
| 3,436,484 | 4/1969 | Whitlow | 370/78 |
| 3,711,651 | 1/1973 | Connell | 370/78 |

FOREIGN PATENT DOCUMENTS

| 940681 | 12/1948 | France . |
| 288636 | 8/1928 | United Kingdom . |
| 467095 | 6/1937 | United Kingdom . |
| 779019 | 7/1957 | United Kingdom . |
| 783597 | 9/1957 | United Kingdom . |
| 855983 | 12/1960 | United Kingdom . |

Primary Examiner—Douglas W. Olms
Assistant Examiner—Frank M. Scutch, III
Attorney, Agent, or Firm—Spencer & Frank

[57] ABSTRACT

A communication system enables a plurality of wide band signals to be carried over a common signal path. Each one of the information channels is used to amplitude modulate selected half-cycles of a common carrier signal. Because successive half-cycles of the carrier signal contain information relating to only one of the information channels any non-linearities in the transmission system do not introduce intermodulation distortions. Successive half-cycles of a carrier signal 5 are routed to separate amplifiers 15, 16, 17 and 18, and the gain of each amplifier is controlled by the signal amplitude of respective information channels 1, 2, 3 and 4. The various half-cycles are then combined at a combiner 21 to re-form the carrier signal which is transmitted over a signal path to a receiver. One of the channels is provided with an identity marker to enable the information channels to be correctly separated and identified at the receiver. By increasing the frequency of the common carrier signal a large number of separate information channels can be carried without requiring the use of a transmission path having an excessively wide bandwidth.

4 Claims, 4 Drawing Figures

COMMUNICATION SYSTEM PROVIDING AMPLIFIER GAIN BY HALF-CYCLE CARRIER SIGNAL CONTROL

This invention relates to a communication system in which a number of wide band signals can be carried by a common signal path. It is well known that a number of different signals can be sent over a single path, if the path is of sufficient bandwidth, by what is sometimes termed carrier frequency stacking. Amplitude modulated or frequency modulated signals are carried by separate carrier signals having different frequencies, and the frequency spacing between adjacent carriers depends on the bandwidth of the amplitude modulation or frequency modulation and on the additional spacing which is needed to ensure adequate separation of the different signals. This can require the provision of a signal path having an excessive great bandwidth. Even so, any non-linearities in the system can introduce very considerable intermodulation products, which are manifest in distortion, and cause degradation of the information signals.

The present invention seeks to provide a communication system in which these disadvantages are reduced.

According to this invention, a communications system includes means for transmitting a plurality of informaton channels on a single carrier signal by arranging that the amplitudes of predetermined half-cycles of one polarity of the carrier signal relate to one of said channels, and that the amplitudes of predetermined half-cycles of the other polarity of the carrier signal relate to another of said channels, said transmitting means includes means for shifting the level of selected cycles of said carrier signal by a polarity which depends on the polarity of the predetermined half-cycles, and wherein signals relating to each of said information channels are utilised to alter the gains of respective amplifiers so as to control the amplitudes of corresponding level shifted half-cycles of the carrier signal which are applied to the amplifiers, and receiving means for receiving the carrier signal and for reconstituting the plurality of information channels.

If only two information channels are to be carried by the carrier signal, then all of the half-cycles of one polarity can relate to one channel and all of the half-cycles of the other polarity can relate to the other channel. In general, however, a greater number of information channels will be carried. For example, if four information channels each having the same bandwidth are to be transmitted on the single carrier, then alternate positive half-cycles are allocated to two of the four channels, and alternate negative half-cycles are allocated to the remaining two channels.

The invention is suitable for transmitting a number of video signals over a single path, such as an optical fibre. For example, if a video signal has a bandwidth of 5 MHz, four such video signals can be transmitted on a carrier signal having a frequency of 20 MHz, and this can easily be handled by a conventional optical fibre link.

Because each successive half-cycle of the carrier contains information relating to only one of the information channels, non-linearities in the transmission system do not introduce intermodulation distortions, and it is not necessary to provide additional bandwidth to provide frequency guard bands.

The information channels can be separated out at the receiving end of the link by any suitable means—for example, a unique identifying code can be inserted into one of the channels to enable operation of a decoder at the receiver to be synchronised to the incoming carrier signal.

BRIEF DESCRIPTION OF THE DRAWING

The invention is further described by way of example with reference to the accompanying drawings in which.

DESCRIPTION OF THE PREFERRED EMBODIMENTS

Figure 1:
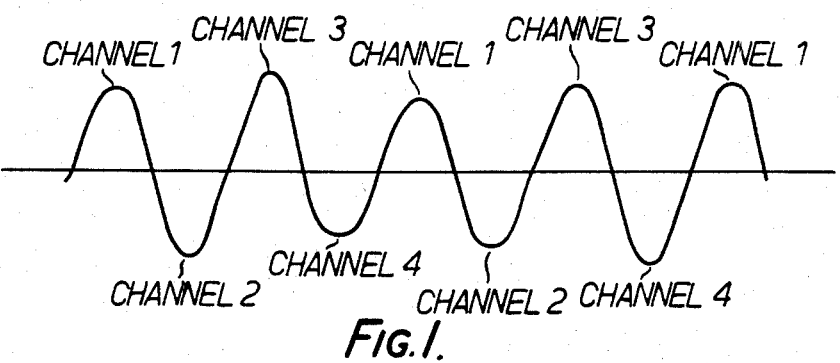
FIG. 1 is an explanatory diagram.

With reference to FIG. 1, the communication system transmits four separate channels of data or information from a transmitter to a receiver using only a single carrier signal. In this example, it is assumed that the carrier signal has a frequency of 20 MHz and that each of the four information channels requires a bandwidth of 5 MHz. Within a band of 5 MHz, video information, such as a conventional television signal can be readily transmitted without loss of picture quality. The information is carried by the single carrier signal of 20 MHz by modifying the peak value of each positive and negative half cycle of its waveform. Samples of each of the four information channels are taken consecutively at a sampling rate of 20 MHz and the amplitudes of the half-cycles modified accordingly. Thus the amplitude of the first positive half-cycle shown in FIG. 1 is dictated by the information content of channel 1, the amplitude of the first negative half-cycle is determined by channel 2, the amplitude of the second positive half-cycle is determined by the third channel and the amplitude of the second negative half-cycle is determined by the fourth channel, after which the sequence repeats itself.

The above system assumes that each of the four information channels has the same bandwidth, but this need not necessarily be the case. Thus if three channels were to be transmitted in which the two channels each had a bandwidth of 5 MHz and a third channel had a bandwidth of 10 MHz, the above system would be modified so that both the first positive half-cycle and the second positive half-cycle related to the same channel.

The bandwidth of the transmission path over which the carrier signal is transmitted need be little wider than 20 MHz and this is in sharp distinction to a more conventional transmission system utilising frequency multiplexing or stacking of amplitude modulation or frequency modulation signals. Furthermore, since in this invention information relating to only a single channel is being transmitted at any one instant in time, intermodulation distortions cannot arise and thus perfect linearity of the transmission encoders is less critical.

Figure 2:
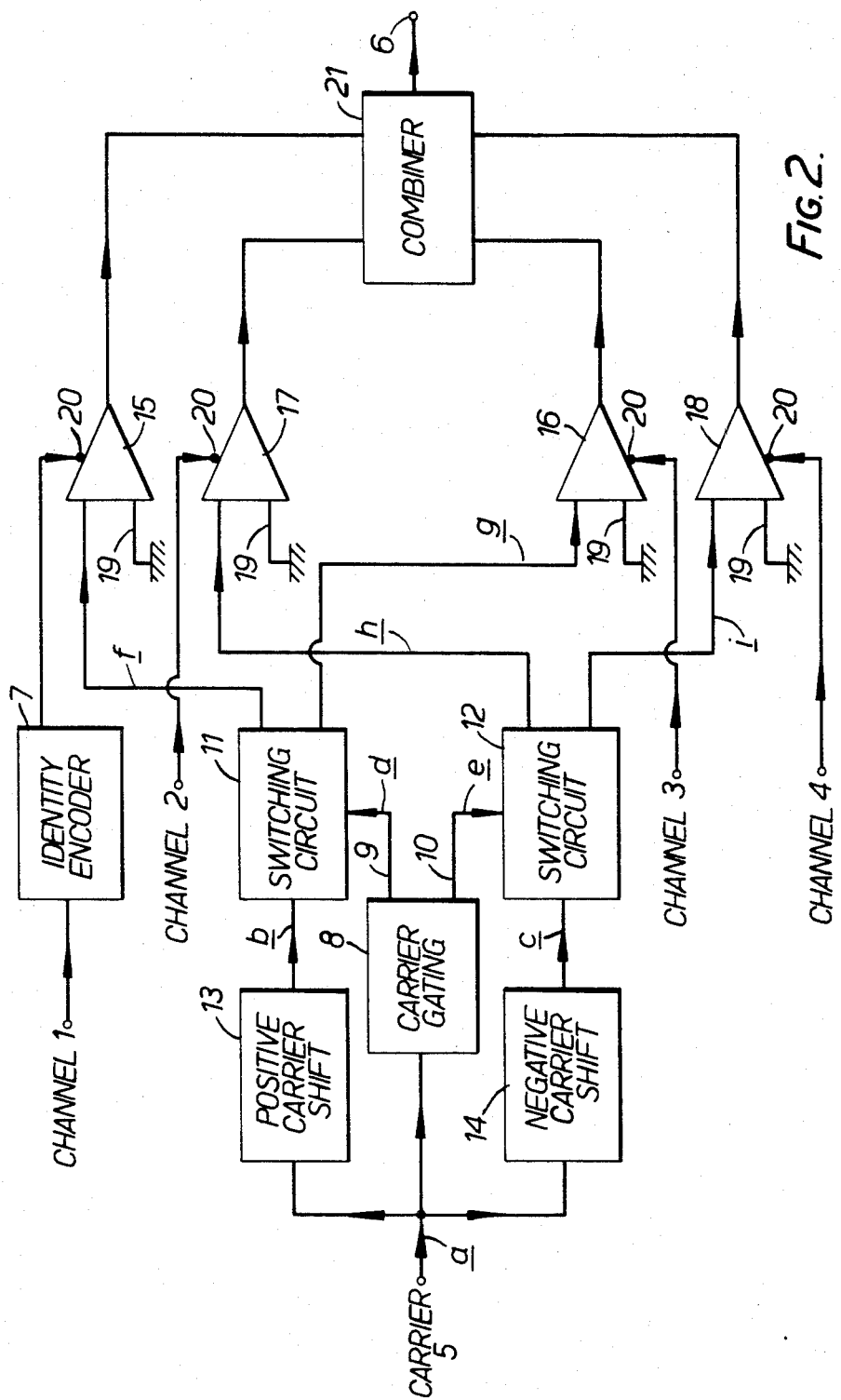
FIG. 2 shows a modulator for transmitting data.
Figure 3:
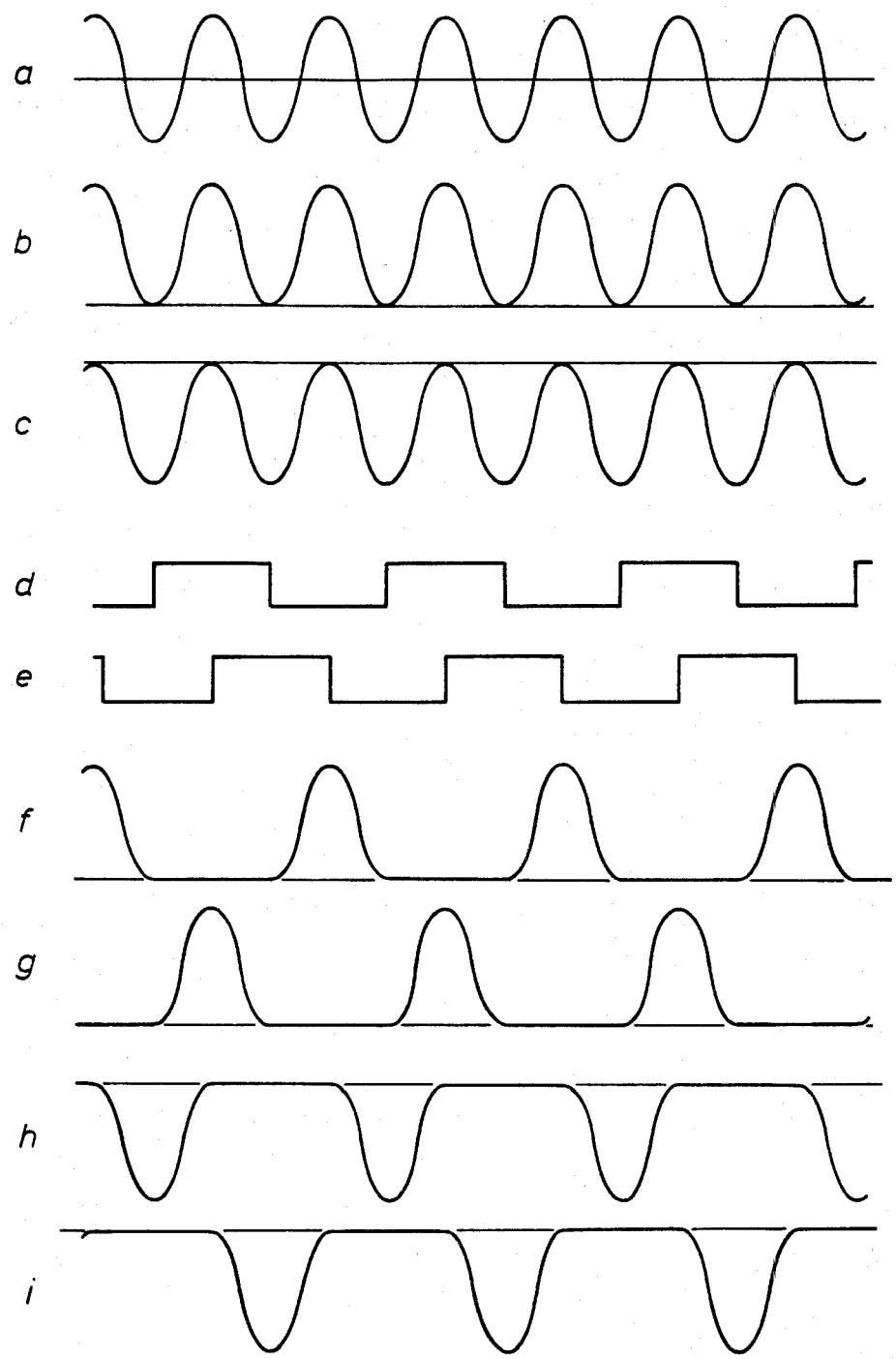
FIG. 3 shows waveforms within the modulator.

FIG. 2 shows a four channel modulator in greater detail in which four separate channels 1, 2, 3 and 4 are used to amplitude modulate a common carrier signal 5 to produce a single amplitude modulated output signal at terminal 6. Each channel comprises an inverted, clamped video signal. Waveforms present at various points in the circuit are shown in FIG. 3. In order to enable the four channels 1, 2, 3 and 4 to be correctly decoded and identified at a receiver an identity code is inserted into channel 1 by an identity encoder 7. The carrier signal 5 (represented as waveform a of FIG. 2) is applied to a carrier gating circuit 8 which generates gating signals d and e on output lines 9 and 10 respectively. These gating signals are routed to control the operating of switching circuits 11 and 12, which respectively receive a positive shifted carrier signal and a negative shifted carrier signal via carrier shift circuits 13 and 14. The outputs of the carrier shift circuits 13 and 14 are represented as waveforms b and c of FIG. 2. The switching circuits 11 and 12 conveniently take the form of Schottky diode bridge networks, and by the application of the gating signals d and e they operate to separate alternate cycles of the carrier waveforms, to produce the four waveforms f, g, h and i. The effect is to route alternate cycles of the carrier which have a centrally positioned positive half-cycle to modulators 15 and 16, and alternate cycles which have centrally positioned negative half-cycles to modulators 17 and 18.

Each modulator 15, 16, 17, 18 simply modifies the amplitude of the appropriate half-cycle in accordance with the nature of the information carried by the respective information channel 1, 2, 3 or 4. Each modulator takes the form of a dual input amplifier, having a reference input 19 connected to ground, and having a variable gain terminal 20. A suitable amplifier is the Motorola MC 1545. The outputs of the four modulators 11, 12, 13 and 14 are fed to a single combiner circuit 21, which acts to reconstitute a single carrier signal of the kind shown in FIG. 1 having half-cycle amplitudes in accordance with the required information content. This single amplitude modulated signal is fed via output terminal 6 over a transmission path to a receiver.

Figure 4:
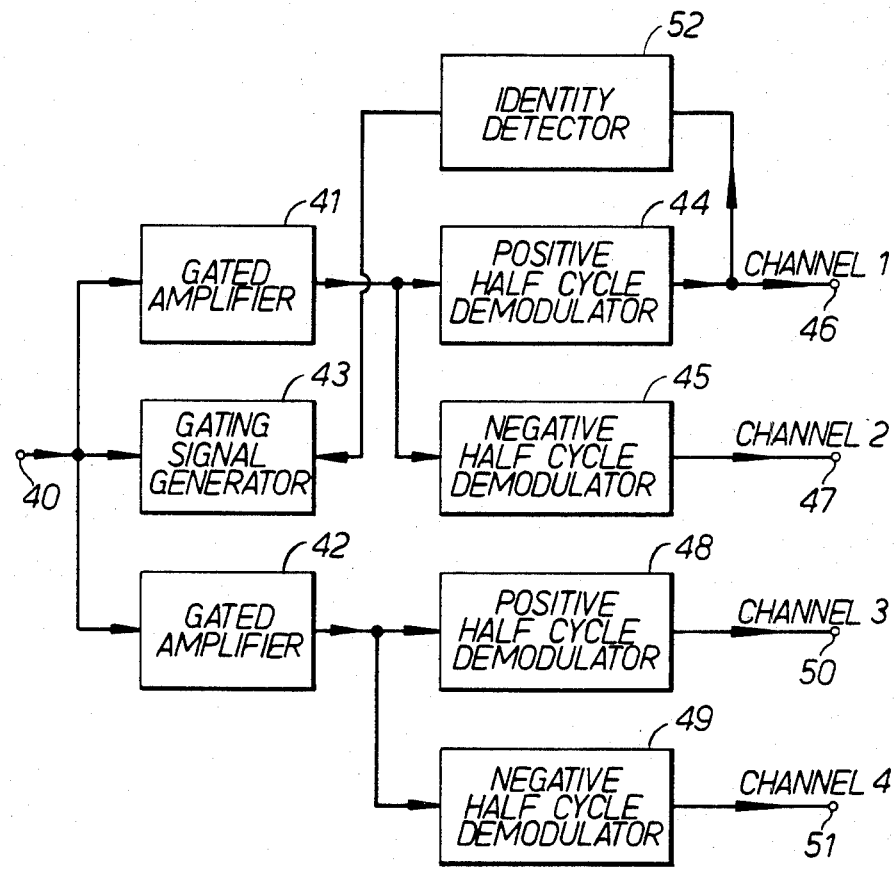
FIG. 4 shows a demodulator for receiving the data.

At the receiver, the incoming signal is demodulated so as to separate out the four channels 1, 2, 3 and 4. A four channel demodulator is illustrated diagrammatically in FIG. 4 in which the received signal which is received at terminal 40 is fed to two amplifiers 41 and 42, which are gated on for alternate full cycles. The switching waveforms which control the gated amplifiers 41 and 42 are generated at a gating generator 43, which contains a 20 MHz oscillator which is synchronised to the incoming signal at terminal 40. The output of amplifier 41 is fed to a pair of of half-cycle demodulators 44 and 45, which are respectively operative to determine the peak values of positive half-cycles and negative half-cycles. The demodulators can be simple peak amplitude detectors, or may comprise a sample and hold circuit synchronised to the carrier frequency by the gating generator 43. These peak amplitude values are fed to respective output terminals 46 and 47. Corresponding half-cycle demodulators 48 and 49 are connected to the amplifier 42 to provide a similar function and to provide information relating to channels 3 and 4 at output terminals 50 and 51 respectively. To bring the operation of the gating generator 43 into synchronisation with the received signal, the output of the demodulator 44 is fed to a code detector 52 which searches for the identification code which was inserted by the identity code generator 7 shown in FIG. 2. If the code is found, then correct synchronisation exists. If, however, it is not found the polarity of the gating signals fed to the two amplifiers 41 and 42 are reversed so as to feed the correct full cycles to the two pairs of demodulators.

If only two channels of each bandwidth are to be transmitted over a link, the circuit arrangement shown in FIG. 2 can be considerably simplified in that the amplitude of all positive half-cycles are controlled by one channel, and all the negative half-cycles are controlled by the second channel. Clearly only two variable gain amplifiers are needed. Conversely the system can be extended to enable many more channels to be transmitted concurrently. However many channels are present, information relating to only one of them is transmitted at any one time, thereby preventing the introduction of intermodulation distortions. It also avoids the need to provide a signal path linking transmitters and receiver which is significantly greater than the sum of the bandwidths of the channels which are handled by the system.

We claim:

1. A communication system including means for transmitting a plurality of information channels on a single carrier signal by arranging that the amplitudes of predetermined half-cycles of one polarity of the carrier signal relate to one of said channels, and that the amplitudes of predetermined half-cycles of the other polarity of the carrier signal relate to another of said channels, said transmitting means including means for shifting the level of selected cycles of said carrier signal by a polarity which depends on the polarity of the predetermined half-cycles, a plurality of amplifiers connected to receive respective level shifted half-cycles of the carrier signal, wherein signals relating to each of said information channels are utilized to alter the gain of respective ones of said amplifiers so as to control the amplitudes of corresponding level shifted half-cycles of the carrier signal which are applied to said amplifiers, and receiving means for receiving the carrier signal and for reconstituting the plurality of information channels.

2. A system as claimed in claim 1 and wherein each of said predetermined half-cycles is centrally positioned within its corresponding whole cycles which is fed to a respective amplifier.

3. A system as claimed in claim 2 and wherein the outputs of each of said amplifiers are combined together to re-form the carrier signal prior to transmission to said receiving means.

4. A system as claimed in claim 1 and wherein at least one of said information channels includes an identity marker by means of which the reconstituted information channels can be identified at said receiving means.

* * * * *